US006170953B1

(12) United States Patent
Lee et al.

(10) Patent No.: US 6,170,953 B1
(45) Date of Patent: Jan. 9, 2001

(54) LASER VIDEO PROJECTOR FOR PROJECTING IMAGE TO A PLURALITY OF SCREENS

(75) Inventors: Jin-ho Lee, Suwon; Young-mo Hwang, Seoul, both of (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 09/273,744

(22) Filed: Mar. 22, 1999

(51) Int. Cl.[7] .................................................. G03B 21/14
(52) U.S. Cl. ........................... 353/82; 353/31; 359/205; 348/840
(58) Field of Search .................................. 353/94, 46, 48, 353/49, 50, 51, 122, 82, 31, 34, 37, 98; 359/449; 348/754, 756, 840; 349/197, 202, 216, 205

(56) References Cited

U.S. PATENT DOCUMENTS

| 5,196,875 | * | 3/1993 | Stiickler | 353/97 |
|---|---|---|---|---|
| 5,255,082 | * | 10/1993 | Tamada | 353/31 |
| 5,317,348 | * | 5/1994 | Knize | 353/37 |
| 5,365,288 | * | 11/1994 | Dewald et al. | 353/98 |
| 5,636,912 | * | 6/1997 | Lee et al. | 353/46 |
| 6,002,505 | * | 12/1999 | Kraenert et al. | 359/196 |
| 6,011,643 | * | 1/2000 | Wunderlich et al. | 359/279 |
| 6,018,408 | * | 1/2000 | Hong | 359/201 |
| 6,020,937 | * | 2/2000 | Bardmesser | 353/37 |

* cited by examiner

Primary Examiner—William Dowling
(74) Attorney, Agent, or Firm—Burns, Doane, Swecker & Mathis, L.L.P.

(57) ABSTRACT

A laser video projector for projecting an image to a plurality of screens is provided. It is possible to display an identical image to a plurality of screens by modulating light from the light source by an acousto-optic modulator (AOM) according to a video signal and projecting video information to a plurality of screens using a scanner. The laser video projector includes a light source for outputting a beam of white light, a light separator for separating the beam of the white light into beams of monochromatic lights having first, second, and third wavelengths, a light modulator for modulating the beams of the monochromatic lights according to a chrominance signal, a light combiner for combining the monochromatic lights modulated by the light modulator into a beam, a light scanner for scanning the combined beam of the modulated monochromatic lights, thus forming an image, a multi-screen projecting optical system for changing the light path so that the image formed by the light scanner is displayed on multiple screens, and a plurality of screens corresponding to the plurality of images.

14 Claims, 3 Drawing Sheets

LASER VIDEO PROJECTOR FOR PROJECTING IMAGE TO A PLURALITY OF SCREENS

BACKGROUND OF THE INVENTION

1. Field of the Invention

The present invention relates to a laser video projector for projecting an image to a plurality of screens, and more particularly, to a laser video projector using laser as a light source for modulating light from the light source by an acousto-optic modulator (AOM) according to a video signal and projecting video information to a plurality of screens using a scanner.

2. Description of the Related Art

A flat panel display device such as a liquid crystal display or a cathode ray tube of a television set is a conventional representative video display means. However, the cathode ray tube or the liquid crystal display is more difficult to manufacture and the resolution becomes worse as the screen size increases. Accordingly, there are limits to the practical use of the cathode ray tube or the liquid crystal display the screen size of which becomes larger. Therefore, a method of enlarging an image displayed on the cathode ray tube or the liquid crystal display by a lens and projecting the enlarged image to a screen is used in order to realize a large screen.

A method of projecting red, green, and blue images to the screen one above the other using three cathode ray tubes and three lenses independently is disclosed in U.S. Pat. No. 4,942,525 and a method of composing images having the respective colors from the three cathode ray tubes and projecting the composed image to the screen by a lens is disclosed in U.S. Pat. No. 4,842,394.

The conventional video displaying method in the cathode ray tube or the liquid crystal display, used for displaying an image on a large screen has problems in that the picture projected to the screen is not clear since the displayed image is projected after being enlarged by the lens only and that the brightness is low since the output of the light source is limited since the video displaying means, in particular, an optical system can be damaged due to a temperature characteristic.

Also, in the conventional video projector such as the cathode ray tube or the liquid crystal display, an image is projected to a screen by a projector. Considering that the demand for outdoor advertisements using a large screens is remarkably increasing, the fact that it is not possible to display an image on a plurality of screens from a video projector may deteriorate the effect of advertisement. Furthermore, when the image is projected after being enlarged by the lens only, the picture quality worsens when the image is projected to a plurality of screens.

SUMMARY OF THE INVENTION

To solve the above problem, it is an object of the present invention to provide a laser video projector for projecting an image having high contrast and high brightness to a large screen, in particular, to a plurality of large screens.

Accordingly, to achieve the above object, there is provided a laser video projector for projecting an image to a plurality of screens, comprising a light source for outputting a beam of white light, light separating means for separating the beam of the white light into beams of monochromatic lights having first, second, and third wavelengths, light modulating means for modulating the beams of the monochromatic lights according to a chrominance signal, light combining means for combining the monochromatic lights modulated by the light modulating means into a beam, light scanning means for scanning the combined beam of the modulated monochromatic lights, thus forming an image; a multi-screen projecting optical system for changing the light path so that the image formed by the light scanning means is displayed on multiple screens, and a plurality of screens corresponding to the plurality of images.

In the present invention, the light separating means preferably comprises a first dichroic mirror for reflecting at least 99% of monochromatic light of a first wavelength from the beam of the white light and transmitting at least 95% of monochromatic light of second and third wavelengths, a second dichroic mirror for reflecting at least 99% of monochromatic light of the second wavelength and transmitting at least 95% of monochromatic light of the third wavelength, and a high reflection mirror for reflecting at least 99% of the monochromatic light of the third wavelength.

In the present invention, the light modulating means preferably comprises three acousto-optic modulators for modulating the beams of the monochromatic lights of the first, second, and third wavelengths. The light combining means preferably comprises a third dichroic mirror for transmitting the beam of the monochromatic light of the first wavelength and reflecting the beam of the monochromatic light of the second and third wavelengths, a fourth dichroic mirror for reflecting the monochromatic light of the second wavelength and transmitting the monochromatic light of the third wavelength, a high reflection mirror for reflecting the monochromatic light of the third wavelength. The multi-screen projecting optical system preferably comprises a plurality of reflecting mirrors.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Hereinafter, a laser video projector for projecting an image to a plurality of screens according to the present invention will be described in detail with reference to the attached drawings.

According to the laser video projector according to the present invention, it is possible to obtain better picture quality not by forming an image by primary video displaying means but by scanning modulated light to a screen, to remarkably improve brightness by using a high-output light source, and to project an image to a plurality of screens without a conventional video displaying means such as a cathode ray tube or a liquid crystal display.

Figure 1:
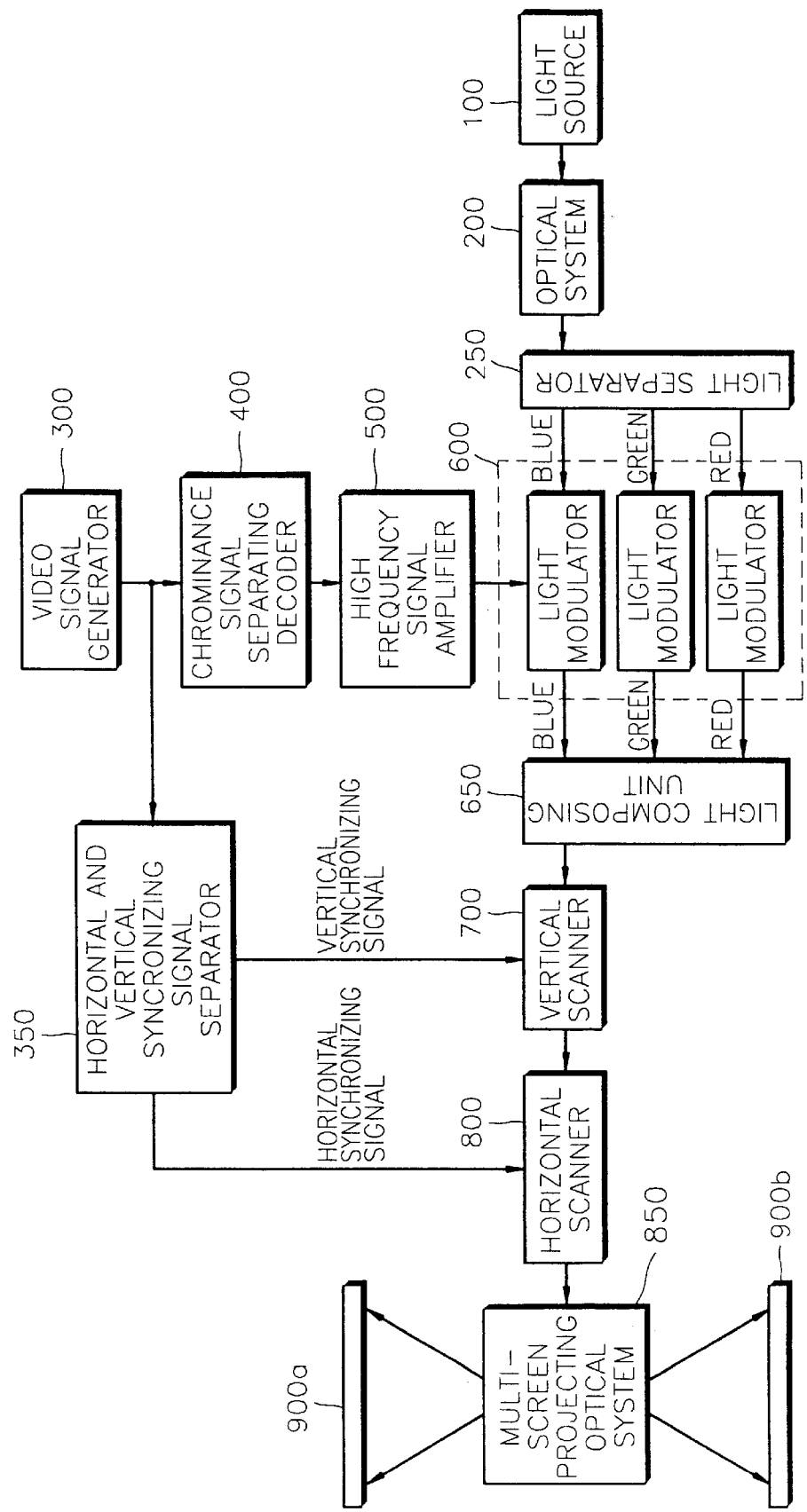
FIG. 1 is a schematic block diagram of a laser video projector for projecting an image to a plurality of screens, according to the present invention.

FIG. 1 is a schematic block diagram of a laser video projector for projecting an image to a plurality of screens, according to the present invention. As shown in FIG. 1, the laser video projector for projecting an image to a plurality of screens according to the present invention includes a light source 100 for emitting white light, an optical system 200 for collecting the white light emitted from the light source 100 in the form of a beam, a light separator 250 for separating the laser beam of the white light incident from the optical system 200 into beams of red, green, and blue monochromatic lights, a video signal generator 300 for providing a predetermined video signal, a synchronizing signal separator 350 for separating horizontal and vertical synchronizing signals from the video signal provided from the video signal generator, a chrominance signal separating decoder 400 for separating a chrominance signal from the video signal provided from the video signal generator 300, a high frequency signal amplifier 500 for amplifying the chrominance signal separated from the chrominance signal separating decoder 400, a light modulator 600 for modulating the beam incident from the optical system 200 using the video signal (the chrominance signal) provided from the high frequency amplifier 500, a light combining unit 650 for combining the modulated red, green, and blue monochromatic lights into a laser beam having image information, a vertical scanner 700 and a horizontal scanner 800 for scanning the combined laser beam from the light combining unit 650 to vertical and horizontal directions using the horizontal and vertical synchronizing signals provided from the synchronizing signal separator 350, a multi-screen projecting optical system 850 (refer to FIG. 2) comprised of reflecting mirrors for projecting the modulated laser beam provided from the vertical scanner 700 and the horizontal scanner 800 to a plurality of screens, and a plurality of screens 900a and 900b.

Figure 2:
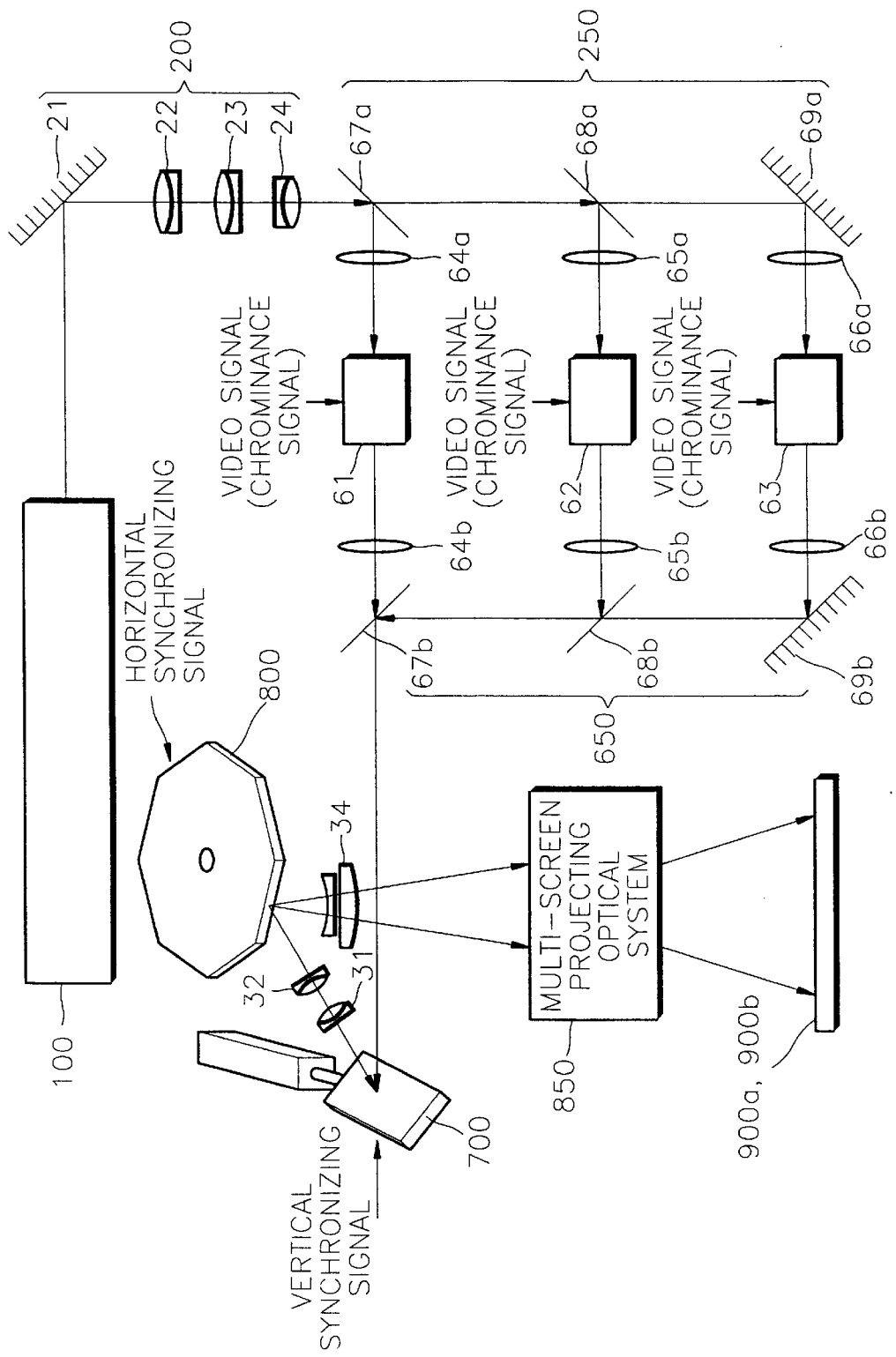
FIG. 2 shows the schematic arrangement of an optical system of the laser video projector for projecting an image to a plurality of screens of FIG. 1.

The embodiment of the laser video projector for projecting an image to a plurality of screens having the above structure is shown in FIG. 2. The light source 100 is formed of white light laser for generating white light. In particular, the main wavelengths of the white light laser beam emitted from the light source are respectively 488 nm, 514 nm, and 647 nm. The optical system 200 comprised of a high reflection mirror 21 for changing the path of the laser beam generated from the light source 100, a collimating lens 22 for changing the laser beam into parallel light, and telescopic lenses 23 and 24 for reducing the size of the parallel beam is arranged on the light path of the light source 100. In the telescopic lenses 23 and 24, one having a long focal distance is placed at a leading end and the other having a short focus distance is placed at a lagging end. The laser beam having a uniform divergence angle becomes a parallel beam, passing through the collimating lens 22 and comes to have a size of the beam reduced by the scaling ratios of the two lenses constructing the telescopic lens, passing through the telescopic lenses. The size of the beam is reduced so as to most effectively perform light modulation by an acousto-optic modulator (AOM) installed in a limited space.

The light separator 250 separates the laser beam of the white light incident from the telescopic lenses 23 and 24 of the optical system 200 into red, green, and blue monochromatic lights. The light separator 250 includes two dichroic mirrors 67a and 68a and a high reflection mirror 69a. The dichroic mirror 67a reflects at least 99% of blue light and transmits at least 95% of lights of other wavelengths. The dichroic mirror 68a reflects at least 99% of green light and transmits at least 95% of red light. The high reflection mirror 69a reflects the transmitted red light and makes the reflected light incident on an acousto-optic modulator 63. In particular, a dichroic mirror which remarkably improves a transmission factor and a reflectivity with respect to the main wavelengths of the light source 100, i.e., 488 nm, 514 nm, and 647 nm is used as the dichroic mirror.

The thickness of the beam incident on light modulators 61, 62, and 63 passing through the light separator 250 should be 200 μm, which is possible by installing focusing lenses 64a, 65a, and 66a at the leading ends of the light modulators 61, 62, and 63 by a uniform distance. The distance between the focusing lenses 64a, 65a, and 66a and the light modulators 61, 62, and 63 are determined according to the size of the beam incident on the focusing lenses 64a, 65a, and 66a. As the size of the beam becomes smaller, the distance between the focusing lenses 64a, 65a, and 66a and the light modulators 61, 62, and 63 for obtaining a 200 μm beam waste diameter from the light modulators 61, 62, and 63 is reduced. However, when the size of the beam is reduced too much, the lenses or the mirrors are damaged since the light intensity per unit area increases. Therefore, it is necessary to determine the appropriate size of the diameter of the beam.

The light modulator 600 includes the three AOM (acousto-optic modulator) 61, 62, and 63 for modulating the beams of the red, green, and blue monochromatic lights obtained by separating the beam of the white light, in the video signal provided by the video signal generator 300, provided by the light source 100 according to the chrominance signal (amplified by the high frequency amplifier 500) separated by a decoder 400 through the optical system 200 and the light separator 250 to the optical signals of the monochromatic lights.

The light combining unit 650 combines the beams of the monochromatic lights modulated to the optical signals by the acousto-optic modulators 61, 62, and 63 and forms a video signal in the form of a beam of various colors. The light combining unit 650 is comprised of dichroic mirrors 67b and 68b installed for combining the beams of the monochromatic lights into the video signal in the form of the beam to be projected to the screen 900 and a high reflection mirror 69b for changing the path of the separated monochromatic light.

The vertical scanner 700 includes a galvanometer. The horizontal scanner 800 includes a polygonal mirror.

The laser video projector for projecting an image to a plurality of screens having the above structure operates as follows.

First, the white light emitted from the light source 100 is reflected to the high reflection mirror 21 and becomes a parallel laser beam in the collimating lens 22. The laser beam is separated into blue, green, and red lights, passing through the telescopic lenses 23 and 24 and the dichroic mirrors 67a and 68a. The separated lights are incident on the acousto-optic modulators 61, 62, and 63. Namely, at least 99% of the blue light is reflected from the dichroic mirror 67a and is incident on the acousto-optic modulator 61. At least 95% of the light of other wavelengths is transmitted. At least 99% of the green light is reflected from the dichroic mirror 68a and is incident on the acousto-optic modulator 62. At least 95% of the red light is transmitted. The transmitted red light is reflected by the high reflection mirror 69a and is incident on the acousto-optic modulator 63. Considering that the main wavelengths of the white light laser which is a single light source used for the laser video projector for projecting an image to a plurality of screens are 488 nm, 514 nm, and 647 nm, the dichroic mirror is installed so as to remarkably improve the transmission factor and the reflectivity with respect to the main wavelengths. It is possible to remarkably improve a chrominance realizing performance by improving the transmission factor and the reflectivity with respect to the main wavelengths of the white light laser beam.

The monochromatic lights incident on the acousto-optic modulator 63 are modulated by the video signal provided by the video signal generator 300. To be specific, the chrominance signals of the blue, green, and red lights are separated by the chrominance signal separation decoder 400 in the video signal provided by the video signal generator 300. The separated chrominance signal is amplified by the high frequency amplifier 500. The monochromatic lights are modulated according to the amplified respective chrominance signals. Therefore, video information in units of pixels is loaded on the modulated monochromatic light. The focusing lenses 64a, 65a, and 66a having an appropriate focal distance, arranged at the leading ends of the acousto-optic modulators 61, 62, and 63 are for maximizing the optical efficiency of the acousto-optic modulators 61, 62, and 63. The lenses 64b, 65b, and 66b having the same focal distance as that of the focal lenses, placed at the lagging ends of the acousto-optic modulators 61, 62, and 63 are for restoring the size of the laser beams of the modulated monochromatic lights to the size of the parallel laser beam being incident on the focusing lenses.

The modulated blue, green, and red monochromatic lights are combined into a beam by the dichroic mirrors 67b and 68b and the high reflection mirror 69b forming the light combining unit 650. The green light is reflected from the dichroic mirror 68b. The red light passes through the dichroic mirror 68b. The blue light passes through the dichroic mirror 67b. The red and green lights are reflected from the dichroic mirror 67b. However, the design of the dichroic mirror and the separation order of the blue, green, and red lights can vary.

The light combined by the light combining unit 650, on which the video information is loaded is vertically scanned by the vertical scanner 700 and horizontally scanned by the horizontal scanner 800. Accordingly, a picture is focused on a plurality of screens 900a and 900b. Namely, in the modulated combined light, the scanning path is changed to be vertical by the galvanometer of the vertical scanner 700 and to be horizontal by the polygonal mirror of the horizontal scanner 800. Accordingly, pictures are formed. The respective pictures are projected to the respective screens 900a and 900b by the multi-screen projecting optical system 850.

Figure 3:
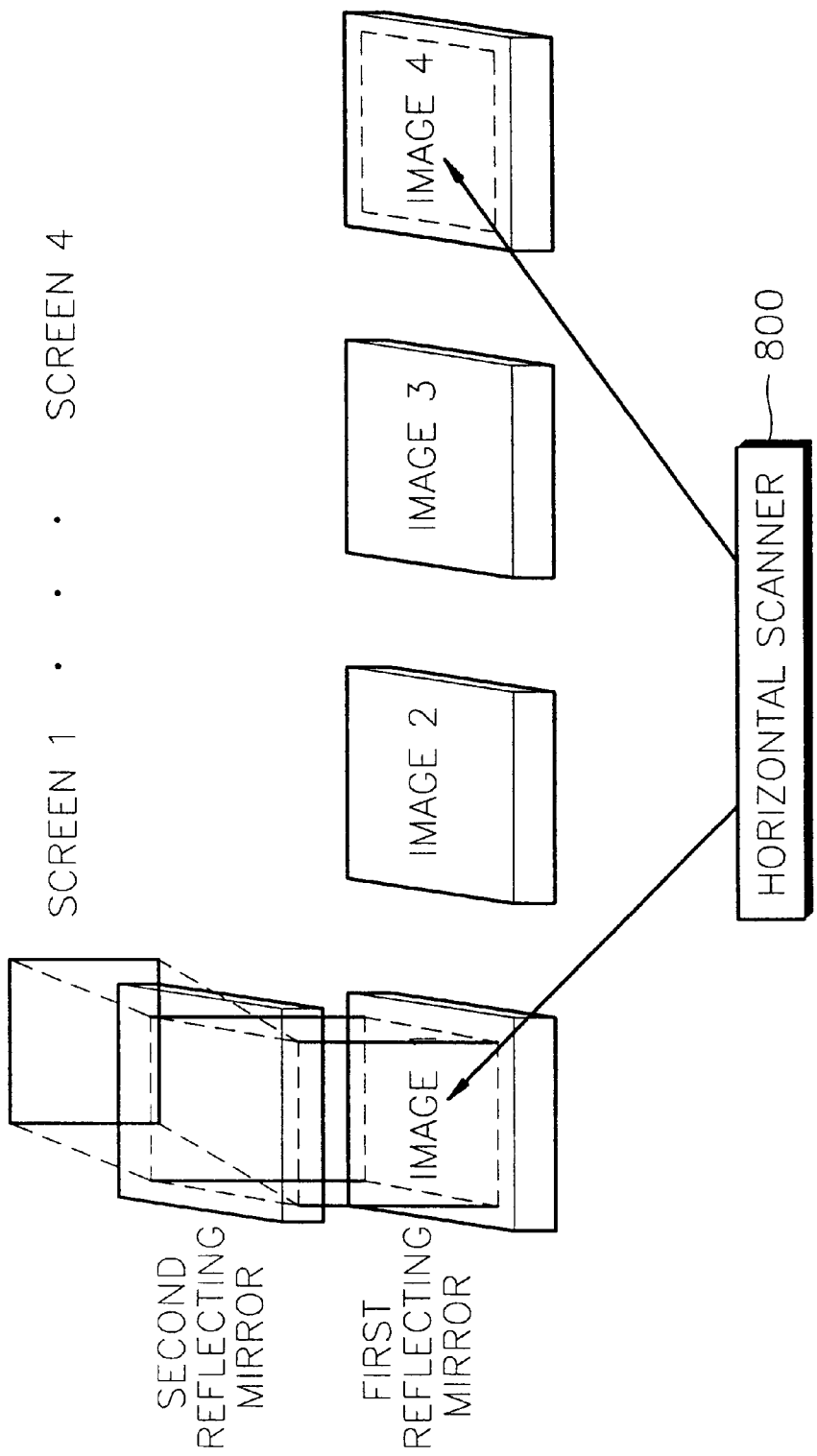
FIG. 3 shows the schematic structure of an optical system for projecting an image to a plurality of screens.

FIG. 3 shows the schematic structure of the multi-screen projecting optical system used for the laser video projector for projecting an image to a plurality of screens according to the present invention. As shown in FIG. 3, the multi-screen projecting optical system 850 including a plurality of (four pairs of) first and second reflecting mirrors projects the modulated light scanned from the horizontal scanner 800 to a plurality of (four) screens. When the speed of the polygonal mirror which is the horizontal scanner 800 is reduced by one half or the number of rotating surfaces is reduced by one half relative to each image, it is possible to form two images each having 525/2 horizontal scanning lines. When the speed of the polygonal mirror is reduced by one half, and the number of rotating surfaces is reduced by one half, four images each having 525/4 horizontal scanning lines are formed. It is possible to obtain various identical pictures from a projector by separating the respective images using an optical system comprised of reflecting mirrors and directing the optical system to the screens to which the images are to be projected. The pair of first and second reflecting mirrors separate the respective images and project the separated images to the screen in a desired position. Therefore, the arrangement of the reflecting mirrors changes according to the positions of the respective screens. Third and fourth reflecting mirrors may be necessary.

Relay lenses 31 and 32 are included between the galvanometer of the vertical scanner 700 and the polygonal mirror of the horizontal scanner 800. The galvanometer of the vertical scanner 700 moves up and down at a speed synchronized by the vertical synchronizing signal separated from a horizontal or vertical synchronizing signal separator 350. The polygonal mirror of the horizontal scanner 800 rotates at a speed synchronized by the horizontal synchronizing signal separated from the horizontal or vertical synchronizing signal separator 350. Namely, the scanning path of the modulated beam is changed in the vertical direction by the galvanometer 700. The scanning path of the modulated beam is changed in the horizontal direction by the polygonal mirror 800. Accordingly, the beam is scanned to the entire surface of the screen 900. The relay lenses 31 and 32 between the galvanometer 700 and the polygonal mirror 800 collects light so that the vertically scanned laser beam is incident within the effective area of the polygonal mirror which is the horizontal scanning surface. The relay lenses 31 and 32 having the same focal distance are separated from each other by the addition of the focal distances.

Also, a fθ lens 34 is installed at the leading end on the side of the screen 900 of the polygonal mirror 800. The fθ lens 34 corrects the shape and the size of the beam focused on the screen to be identical in the entire area of the screen. Also, the fθ lens 34 controls the divergence angle of the beam scanned to the screen, thus controlling the size of the beam required on the screen. Namely, the fθ lens 34 controls the picture of the screen to always be natural even when the screen 900 moves back and forth.

As mentioned above, it is possible to project a large picture having high contrast and high resolution, which is closer to a natural color to a plurality of large screens by the laser video projector for projecting an image to a plurality of screens according to the present invention in which laser having a wavelength advantageous to realizing a natural color is used as a light source and the dichroic mirror and the multi-screen projecting optical system for completely separating images from light are included. Therefore, considering that demand for outdoor advertisements using a large picture is increasing, it is considerably advantageous for the advertisement to have same image displayed on a plurality of screens by an image projector. In particular, it is possible to obtain a remarkable effect of advertisement since it is possible to display the same image on a plurality of screens on walls of buildings in a metropolitan area.

What is claimed is:

1. A laser video projector for projecting an image to a plurality of screens, comprising:
   a light source for outputting a beam of white light;
   light separating means for separating the beam of the white light into beams of monochromatic lights having first, second, and third wavelengths;
   light modulating means for modulating the beams of the monochromatic lights according to a chrominance signal;
   light combining means for combining the monochromatic lights modulated by the light modulating means into a beam;
   light scanning means for scanning the combined beam of the modulated monochromatic lights, thus forming an image;
   a multi-screen projecting optical system for changing the light path so that the image formed by the light scanning means is displayed on multiple screens; and
   a plurality of screens corresponding to the plurality of images.

2. The laser video projector of claim 1, wherein the light separating means comprises:
   a first dichroic mirror for reflecting at least 99% of monochromatic light of a first wavelength from the beam of the white light and transmitting at least 95% of monochromatic light of second and third wavelengths; and
   a second dichroic mirror for reflecting at least 99% of monochromatic light of the second wavelength and transmitting at least 95% of monochromatic light of the third wavelength.

3. The laser video projector of claim 2, wherein the light separating means further comprises a high reflection mirror for reflecting at least 99% of the monochromatic light of the third wavelength.

4. The laser video projector of claim 1, wherein the light modulating means comprises three acousto-optic modulators for modulating the beams of the monochromatic lights of the first, second, and third wavelengths.

5. The laser video projector of claim 1, wherein the light combining means comprises:
   a third dichroic mirror for transmitting the beam of the monochromatic light of the first wavelength and reflecting the beam of the monochromatic light of the second and third wavelengths; and
   a fourth dichroic mirror for reflecting the monochromatic light of the second wavelength and transmitting the monochromatic light of the third wavelength.

6. The laser video projector of claim 5, wherein the light combining means further comprises a high reflection mirror for reflecting the monochromatic light of the third wavelength.

7. The laser video projector of claim 1, wherein the light scanning means comprises:
   vertical scanning means for vertically scanning the combined beam output from the light combining means; and
   horizontal scanning means for horizontally scanning the combined beam output from the vertical scanning means.

8. The laser video projector of claim 7, wherein the vertical scanning means comprises a galvanometer.

9. The laser video projector of claim 7, wherein the horizontal scanning means comprises a polygonal mirror.

10. The laser video projector of claim 7, further comprising relay lenses for controlling the vertically scanned combined beam to be incident on the effective area of the horizontal scanning means on a light path between the vertical scanning means and the horizontal scanning means.

11. The laser video projector of claim 7, further comprising a fθ lens for correcting a combined beam scanned to the screen on a light path between the horizontal scanning means and the screen.

12. The laser video projector of claim 1, wherein the multi-screen projecting optical system comprises a plurality of reflecting mirrors.

13. The laser video projector of claim 1, further comprising an optical system for making the laser beam of the white light emitted from the light source a parallel beam and controlling the thickness of the parallel beam on a light path between the light source and the light separating means.

14. The laser video projector of claim 13, wherein the optical system comprises:
   a collimating lens for changing the laser beam of the white light into parallel beam; and
   telescopic lenses for controlling the thickness of the parallel beam.

* * * * *